(12) United States Patent
Zehner et al.

(10) Patent No.: US 9,764,780 B2
(45) Date of Patent: Sep. 19, 2017

(54) CARGO BODY AND METHOD OF ASSEMBLING THE SAME

(71) Applicant: STI Holdings, Inc., Stoughton, WI (US)

(72) Inventors: Riley Zehner, Menomonee Falls, WI (US); Todd Randall Eicher, Monticello, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

(21) Appl. No.: 15/012,359

(22) Filed: Feb. 1, 2016

(65) Prior Publication Data

US 2017/0217505 A1    Aug. 3, 2017

(51) Int. Cl.
| | | |
|---|---|---|
| *B62D 33/04* | (2006.01) | |
| *B62D 27/02* | (2006.01) | |
| *B62D 25/06* | (2006.01) | |
| *B62D 25/20* | (2006.01) | |

(52) U.S. Cl.
CPC .......... *B62D 33/044* (2013.01); *B62D 25/06* (2013.01); *B62D 25/2054* (2013.01); *B62D 27/023* (2013.01)

(58) Field of Classification Search
CPC ....... B62D 25/02; B62D 25/06; B62D 33/044
USPC .................................................. 296/186.1
See application file for complete search history.

(56) References Cited

U.S. PATENT DOCUMENTS

| | | |
|---|---|---|
| 2,332,752 A | 10/1943 | Ratcliff |
| 3,205,001 A * | 9/1965 | Abolins ................. B60J 7/104 105/377.02 |
| 4,496,061 A | 1/1985 | Highsmith |
| 4,502,610 A * | 3/1985 | Todd ................... A01C 15/006 220/315 |
| 4,852,937 A | 8/1989 | Lemieux |
| 4,974,377 A | 12/1990 | Dominitz et al. |
| 5,026,112 A | 6/1991 | Rice |
| 5,398,909 A | 3/1995 | Sandwith |
| 5,454,612 A | 10/1995 | Christensen |
| 5,769,478 A | 6/1998 | Vernese |
| 5,823,501 A | 10/1998 | Schmidt et al. |
| 6,059,258 A | 5/2000 | Jackson |
| 6,082,806 A | 7/2000 | Bogard |
| 6,764,245 B2 | 7/2004 | Popovski |
| D543,491 S | 5/2007 | Weekes |

(Continued)

OTHER PUBLICATIONS

Dual Canoe Trailer, Castle Equipment Co., Retrieved from the Internet on Oct. 20, 2015 <URL: http://www.castlecraft.com/canoe_dual.htm>.

*Primary Examiner* — Pinel Romain
(74) *Attorney, Agent, or Firm* — Michael Best & Friedrich LLP

(57) ABSTRACT

An apparatus and method are provided for assembling a roof or floor of a cargo body, and for securing doors and other portions of a cargo body in place. In some cases, a plurality of sidewalls are provided, each comprising a side panel and an upper rail and/or lower rail coupled to the side panel. A roof panel can be located above the plurality of sidewalls adjacent the upper rails, with a roof bow extending between the upper rails below the roof panel and fixed to a track of one of the upper rails with a fastener. A floor cross member can be located between the lower rails, and can be secured to the lower rails via a track and fastener.

20 Claims, 7 Drawing Sheets

(56) References Cited

U.S. PATENT DOCUMENTS

| | | |
|---|---|---|
| 7,530,614 B2 | 5/2009 | Nichols |
| 8,985,921 B2* | 3/2015 | McCloud ............ B62D 25/2054 410/102 |
| 9,097,443 B2 | 8/2015 | Liu et al. |
| 2009/0159592 A1* | 6/2009 | Vitalis .................. B65D 88/125 220/1.5 |
| 2015/0353138 A1* | 12/2015 | Fenton .................... B62D 25/02 296/186.1 |

* cited by examiner

CARGO BODY AND METHOD OF ASSEMBLING THE SAME

BACKGROUND

The invention relates to cargo body construction, for example, for over-the-road trailers pulled by semi tractors, or for cargo containers. In particular, the invention relates to trailer sidewall panels and joints for such sidewall panels, in addition to trailer doors, walls, floors, and roofs.

SUMMARY

In some embodiments, a method of assembling a roof of a cargo body is provided, wherein a plurality of sidewalls each comprises a side panel and an upper rail coupled to the side panel. A roof panel is located above the plurality of sidewalls adjacent the upper rails. A roof bow extends between the upper rails below the roof panel. The roof bow is fixed to a track of at least one of the upper rails with a fastener.

In some embodiments, the invention provides a cargo body comprising a floor having a floor panel and a cross member for supporting the floor panel, and a plurality of sidewalls, each sidewall comprising a side panel and a lower rail coupled to the side panel. The plurality of sidewalls extends from the floor at the lower rails and at least partially bound a cargo receiving volume in cooperation with the floor panel. The cargo body further comprises a track extending along each of the lower rails and a fastener coupling the cross member to the rail. The fastener is slidably adjustable to different positions along the track to position the cross member to different locations along the rail.

Some embodiments of the present invention provide a cargo body comprising a floor, a roof, a plurality of sidewalls extending from the floor to the roof to define a cargo receiving volume in cooperation with the floor and the roof, a track attached to one or more of the floor, the roof, and a sidewall of the plurality of sidewalls, the track having an elongated slot facing the cargo receiving volume of the cargo body, and a fastener received within the elongated slot and slidably engageable along the track within the elongated slot for adjustably securing a component of the cargo body to different locations along the track.

Before any embodiments of the present invention are explained in detail, it should be understood that the invention is not limited in its application to the details or construction and the arrangement of components as set forth in the following description or as illustrated in the accompanying drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

Figure 1:
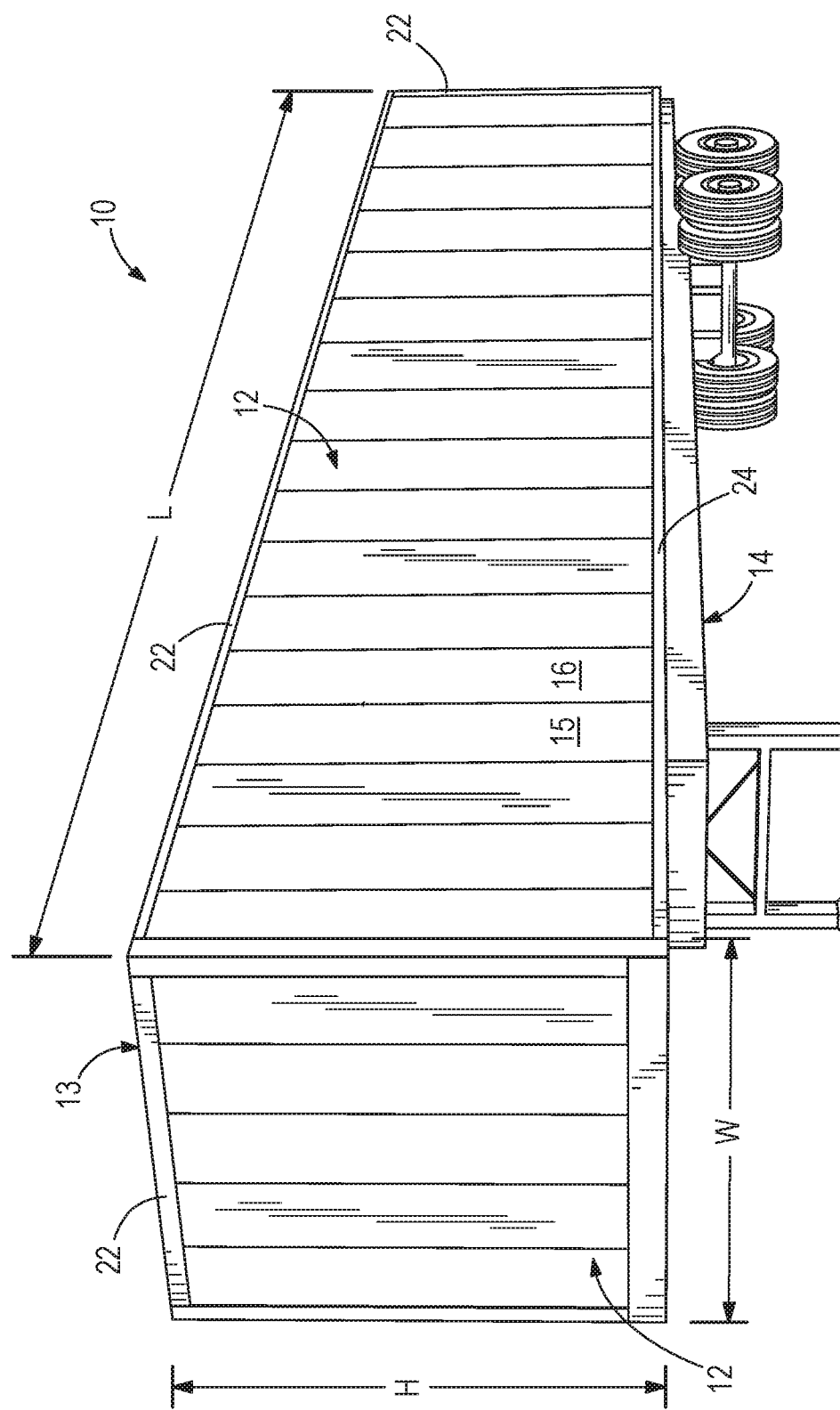
FIG. 1 is a perspective view of a trailer, including a plurality of sidewalls having sidewall joints, according to an embodiment of the present invention.
Figure 2:
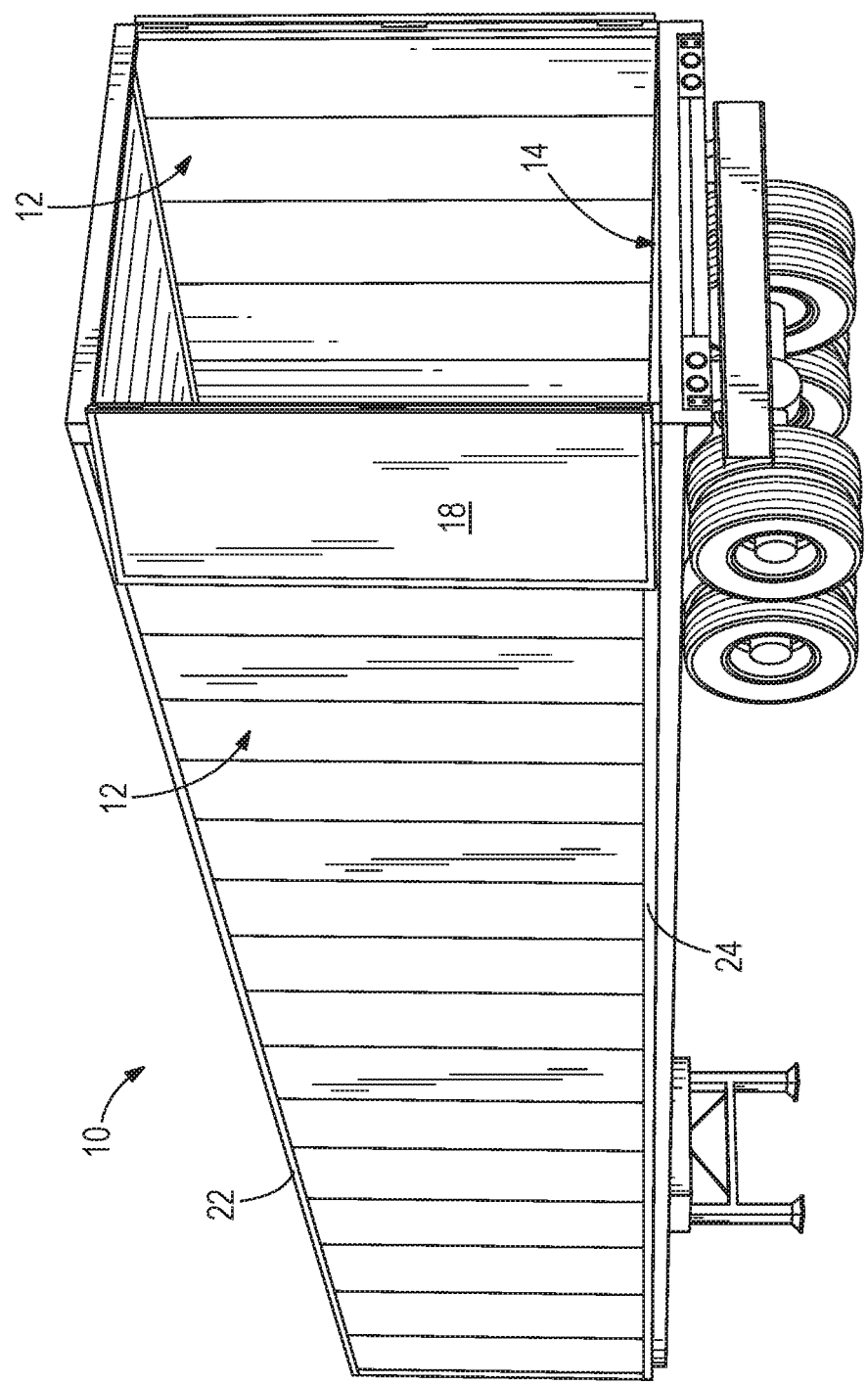
FIG. 2 is an alternate perspective view of the trailer of FIG. 1.

FIGS. 1 and 2 illustrate a cargo body configured as a trailer 10 for over-the-road use with a truck to transport large cargo volumes. As shown, the trailer 10 is a semi-trailer configured for use with a road tractor (i.e., in forming a so-called 18-wheeler). Aspects of the invention are not necessarily limited to such a trailer, and other trailer and cargo body configurations (e.g., cargo containers) are understood as optional. As used herein, the terms "trailer" and "cargo body" are used synonymously for all such configurations. The trailer 10 includes a chassis having axles with multiple sets of wheels, although similar cargo bodies may be provided with alternate rolling chassis constructions, or none at all. The trailer 10 defines a length L in a longitudinal or transport direction. The length L can be 53 feet in some constructions, although the trailer 10 can be manufactured to other lengths greater than or less than 53 feet. Perpendicular to the longitudinal direction, the trailer 10 defines a width W and a height H. The width W cooperates with the length L to define a plan view footprint of the trailer 10, while the height H is measured perpendicular to the footprint (i.e., perpendicular to the ground). Subtracting for wall thicknesses, the length L, the width W, and the height H cooperate to define a cargo receiving interior volume of the trailer 10.

The illustrated trailer 10 includes a plurality of sidewalls 12, including two primary lengthwise sidewalls 12 and a sidewall 12 facing the leading direction and spanning between the two primary lengthwise sidewalls 12. All of the sidewalls 12 extend between a roof 13 of the trailer 10 and a floor 14 of the trailer 10. As discussed in further detail below, the sidewalls 12 can be constructed of pairs of panels 15, 16 joined together by joints extending parallel to the direction of the trailer height H between the roof 13 and the floor 14. Top rails or upper rails 22 and bottom rails 24 are provided to flank and secure the upper and lower edges of each of the sidewall panels 15, 16. At the rear of the trailer 10 as shown in FIG. 2, at least one door panel 18 is provided to selectively open for accessing the interior cargo volume for loading and unloading.

Figure 3:
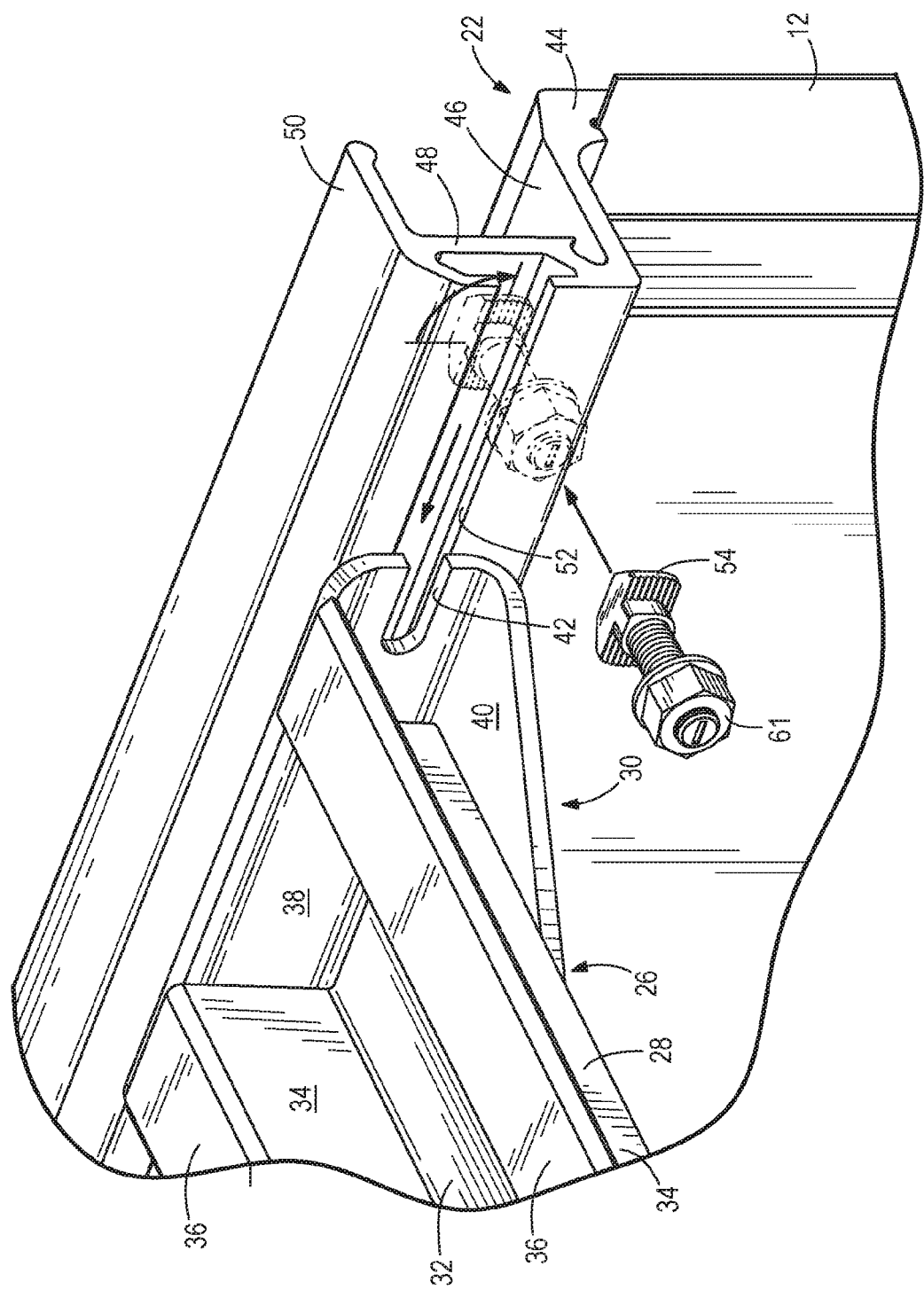
FIG. 3 is a partially exploded perspective view of a roof bow and upper rail according to an embodiment of the present invention.

FIG. 3 illustrates an upper rail 22 which supports a first end of a roof bow 26. A second end of the roof bow 26 (not shown) mirrors the first end, and is supported by a second upper rail 22 in a similar manner. The roof bow 26 spans most or all of the width W of the trailer between parallel sidewalls 12, and in the illustrated embodiment includes a flanged channel beam 28 with end caps 30. In other embodiments, the roof bow 26 can have any other shape desired, such as roof bows 26 having an I, C, or V cross-sectional shape, by way of example only. The illustrated flanged channel beam 28 includes a lower portion 32 which transitions to side portions 34, perpendicular to the lower portion 32, thereby defining a channel. Flanges 36 extend outward from the side portions 34. When assembled, the base portion 32 and the flanges 36 are parallel to one another, and the roof 13 of the trailer 10. The flanges 36 may include apertures (not shown) for fixing the roof 13 to the roof bow 26, which, when assembled, can be adjacent the roof 13. When assembled, the beam 28 may be under compression in an arcuate shape.

The end caps 30 are fixed (e.g., welded, bolted, etc.) to the flanged channel beam 28 at the ends of the beam 28, thereby abutting the upper rail 22 when installed. In other embodiments, the end caps 30 can be integrally formed at the ends of the beam 28, such as by being defined by bent portions of the beam 28, or can be attached to the ends of the beam 28 in any other suitable manner. The end cap 30 includes a first surface 38 that is parallel with the sidewalls 12 (and that is therefore also parallel with a constant cross-section of the beam 28). The first surface 38 extends beyond at least one of the side portions 34 of the beam 28, and an aperture 42 in the end cap 30 extends from an edge of the end cap 30 without extending into the channel. The aperture 42 can have one or more open ends (e.g., slot 42 in the embodiment of FIGS. 3 and 4), or alternatively may have no open ends (e.g., hole 142, 242 in the embodiments of FIGS. 6 and 7, also described below). In some embodiments, either or both ends of the beam 28 are provided with elements that provide strength to the beam 28 and the location of connections between the beam 28 and the rail 22 as discussed in greater detail below. For example, in the illustrated embodiment of FIGS. 3 and 4, a second surface 40 extends perpendicular from the first surface 38, and is parallel and adjacent the lower portion 32 of the beam 28 to provide structural support for the beam 28. The second surface 40 may also include one or more apertures (not shown) for fastener(s) to fix the end cap 30 to the beam 28.

Figure 4:
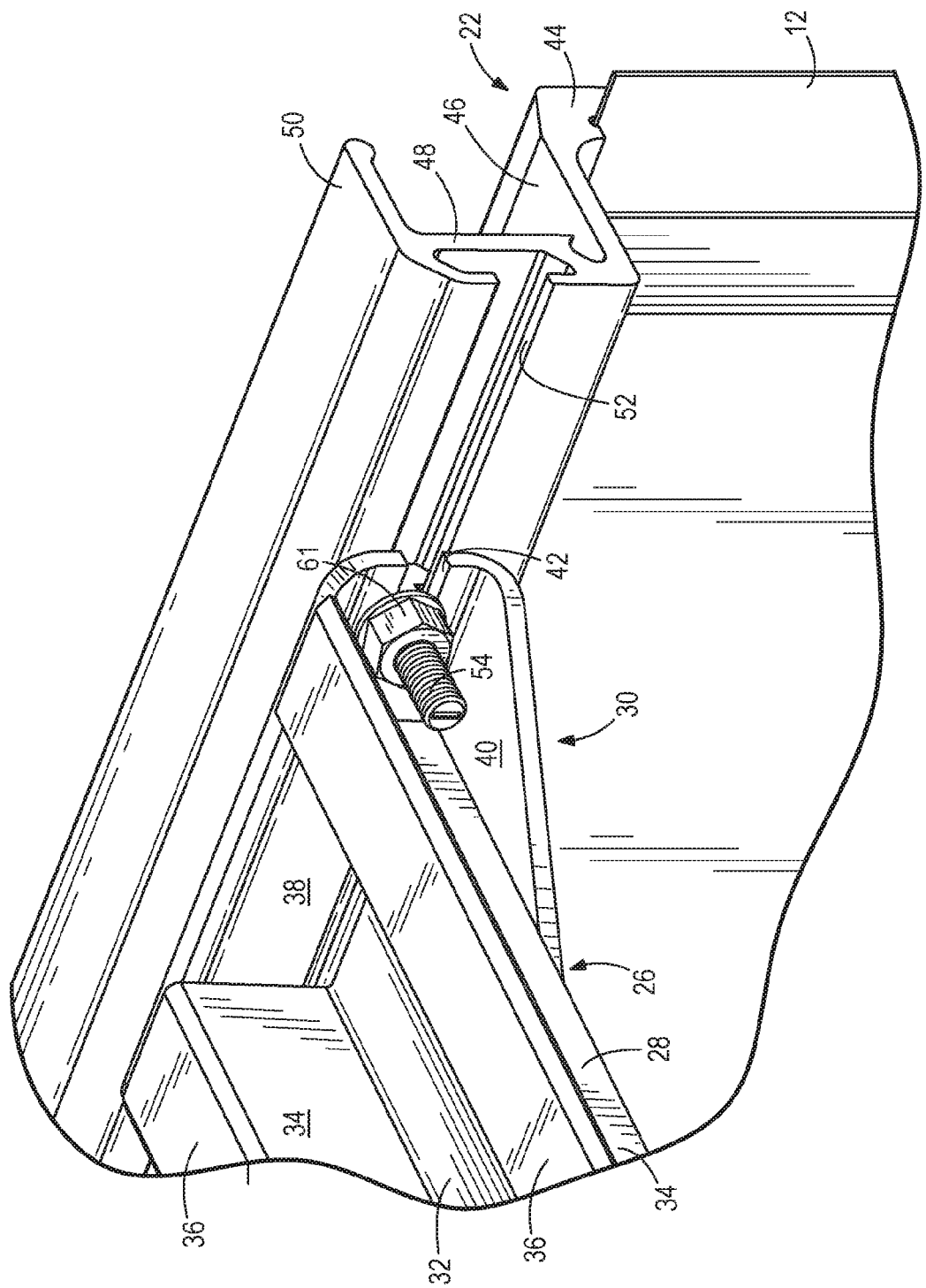
FIG. 4 is a perspective view of the installed roof bow of FIG. 3.

The upper rail 22 is fixed to the sidewall 12, extends upward (i.e., away from the floor) from the sidewall 12, and can span an existing gap between the sidewall 12 and the roof 13. The upper rail 22 can have a constant cross-sectional shape along the lengthwise direction L of the trailer 10. In the illustrated embodiment of FIGS. 3 and 4, the upper rail 22 includes a first portion 44, a second portion 46, a channel 48, and a third portion 50. Though described as separate portions 44, 46, 48, 50, the upper rail 22 may be formed as a single component (e.g., via extrusion, etc.). Also, the upper rail 22 can have different shapes and portions than shown in FIGS. 3 and 4, such as a rail having a rectangular cross-sectional shape, a L-shaped cross-section, and the like. With reference to FIGS. 3 and 4 by way of example, the first portion 44 of the illustrated rail 22 extends upward from the sidewall 12 and is fixed to the sidewall 12 via a fastener (i.e., bolt, rivet, etc.). The second portion 46 extends inwardly from the first portion and the sidewall 12, and in some embodiments can be perpendicular to the first portion 44. The illustrated channel 48 is offset from and extends parallel to the first portion 44, and connects the second portion 46 to the third portion 50. The channel 48 is described in greater detail below. The illustrated third portion 50 is parallel to the second portion, and extends outwardly with respect to the interior receiving volume of the trailer 10. The third portion 50 can define a lip for holding the roof 13 at the upper rail 22. The roof 13 of the illustrated embodiment extends over the roof bows 26 and across and around the third portion 50 of the upper rail 22. During installation, the roof 13 may be slidably attached to the upper rail 22, or may be bent or crimped around the third portion 50.

Figure 5:
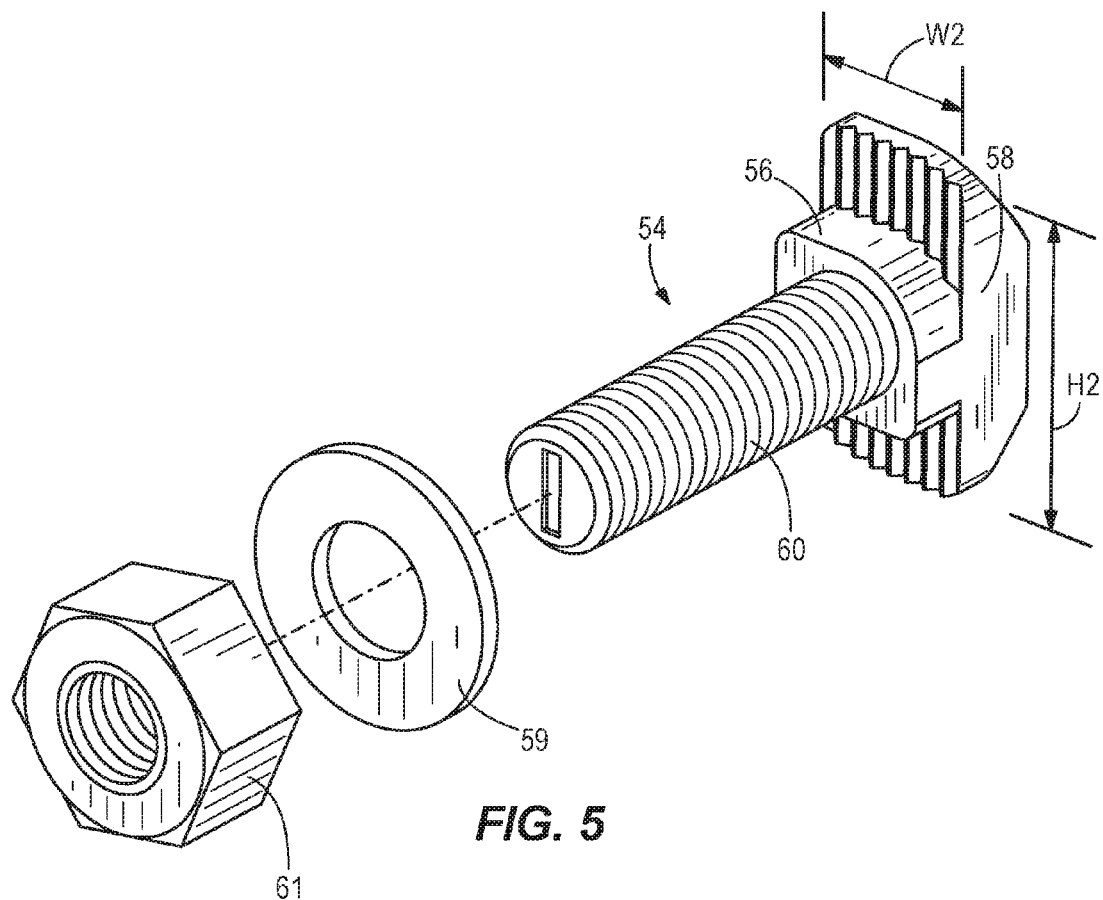
FIG. 5 is a perspective view of a nut and T-bolt assembly for use in embodiments of the present invention.

In some embodiments, the channel 48 has a similar height (parallel to the height H of the trailer 10) as the end cap 30 of the mating roof bow 26. As shown in FIGS. 3 and 4, the channel 48 of the illustrated embodiment is a channel (e.g., a C-shaped channel) with an opening 52 extending along the length of the rail 22. The height of the opening 52 is similar to the height of the slot 42, and is less than the height of the channel 48 itself. The height of the opening 52 is sized to accept the shank 56 or threads 60 of a fastener 54 such as a bolt, which is shown in greater detail in FIG. 5.

In some embodiments, the bolt 54 is a T-bolt with a head 58 centered upon the shank 56. The head 58 can be a rectangular shape that having one dimension (perpendicular to the shank 56) that is larger than the height of the opening 52 and another (also perpendicular to the shank 56) that is the same or smaller than the height of the opening 52. In this manner, the head 58 is enlarged in at least one dimension, yet can still be inserted or removed laterally into and out of the opening 52 of the channel 48 (as shown by the arrow extending from the head shown in solid lines in FIG. 3) in at least one orientation of the head 58 with respect to the opening 52. In other embodiments, the fastener 54 can have other head shapes that perform the same functions of permitting head insertion and removal in one head orientation while permitting head insertion and removal in another head orientation. In the illustrated embodiment of FIGS. 3 and 4, the rectangular head 58 has a width W2 substantially equal to the diameter of the shank 56, and a height H2 greater than the width W2. The shank portion 56 transitions to the threaded portion 60.

Prior to assembling the roof bows 26 to the upper rails 22, the roof 13 may be fixed to the lip 50 of the upper rail 22 such that installation of the roof bows 26 takes place from within the cargo receiving interior volume of the trailer 10. Additionally, temporary supports may be placed between the upper rails 22 (offset from the placement of the roof bows 26) to provide some structural rigidity prior to installation of the roof bows 26. During installation, each roof bow 26 can be placed adjacent the roof 13 with one or both of the end caps 30 compressed between opposing upper rails 22 such that the slot 42 in each end of the roof bow 26 is aligned with the opening 52 in the corresponding adjacent upper rail 22. The head 58 of the bolt 54 can then be moved through the opening 52 in the channel 48 in a first direction. Once within the channel 48, the bolt 54 can be rotated an amount (e.g., a quarter turn) such that the head 58 can no longer be removed from the opening 52 in the upper rail 22 (e.g., height H2 of the head 58 is parallel with the height H of the trailer 10). Once rotated, the geometry of the channel can allow the bolt 54 to slide along the channel 48 in the lengthwise direction L without permitting removal of the bolt 54 from the channel 48 in the first direction (i.e., the head 58 of the bolt 54 is rotated to interact with the inside channel 48 if moved in a direction opposite the first direction). The bolt 54 can be slid into the slot 42 of the roof bow 26 and can be clamped with fastener 61, such as a nut. In some embodiments, a washer 59 can also be used as desired. The bolt 54 and fastener 61 fix the roof boy 26 to the channel 48 of the upper rail 22. Once the roof bows 26 are fixed, any temporary supports (if used) can be removed.

In some alternative embodiments, the head 58 of the fastener 54 is inserted into the opening 52 in the channel 48, and thereafter the opposite end of the fastener 54 is inserted into any other type of aperture 42 in the roof bow 26, such as a hole that is not open to an edge of the roof bow 26 or end cap 30 thereof. Also, in some alternative embodiments, the head 58 of the fastener is not (or cannot be) inserted laterally through the opening 52 and into the channel 48 of the upper rail 22, such as due to the shape and size of the head 58. In such cases, the head 58 of the fastener 54 can be inserted lengthwise into the end of the channel 48 with the shank portion 56 extending through the opening 52, can be slid along the channel 48 to a desired location along the channel 48, and can stay in the channel 48 without the need for later removal.

Contrary to current practices, assembly of the roof bow 26 as described above does not require piercing through the upper rail 22 (i.e., with a bolt or rivet, etc.). Therefore, assembly does not require any drilling or punching, and does not require precise hole placement and registry between roof bows 26 and the upper rail 22. Further, the upper rail 22 is not weakened by drilled or punched holes, there are fewer points for water infiltration, and the outside of the outer rail 22 (outside of the cargo receiving interior volume) retains a more aesthetically pleasing surface. In addition, since in some embodiments the fasteners 54 can be slid along the channel 48 to a number of different desired positions where the fasteners 54 can then be tightened, the corresponding roof bows 26 can be easily adjusted, positioned, and secured in place along any number of different locations along the upper rail 22, such as in a range of positions along the upper rail 22.

Although the illustrated beam 28 in FIGS. 3 and 4 is generally U-shaped with capped ends and laterally-extending end caps 30 in which slots 42 are defined, it should be noted that any other beam 28 and beam end shape (whether defined in part or entirely by end caps 30) can instead be used while still providing the necessary slots 42 or other apertures needed for receiving the fasteners 54 to secure the beam 28 to the rail 22. Also, the ends of the beam 28 (i.e., the end caps 30 of the beam 28) can abut the corresponding adjacent upper rails 22, or one or more elements can be located between the ends of the beam 28 and the corresponding adjacent upper rails 22. In both cases, the fasteners 54 still extend through respective apertures in the beam 28 and upper rails 22, and can be adjusted and tightened to secure the beam 28 to the upper rails 22.

Figure 6:
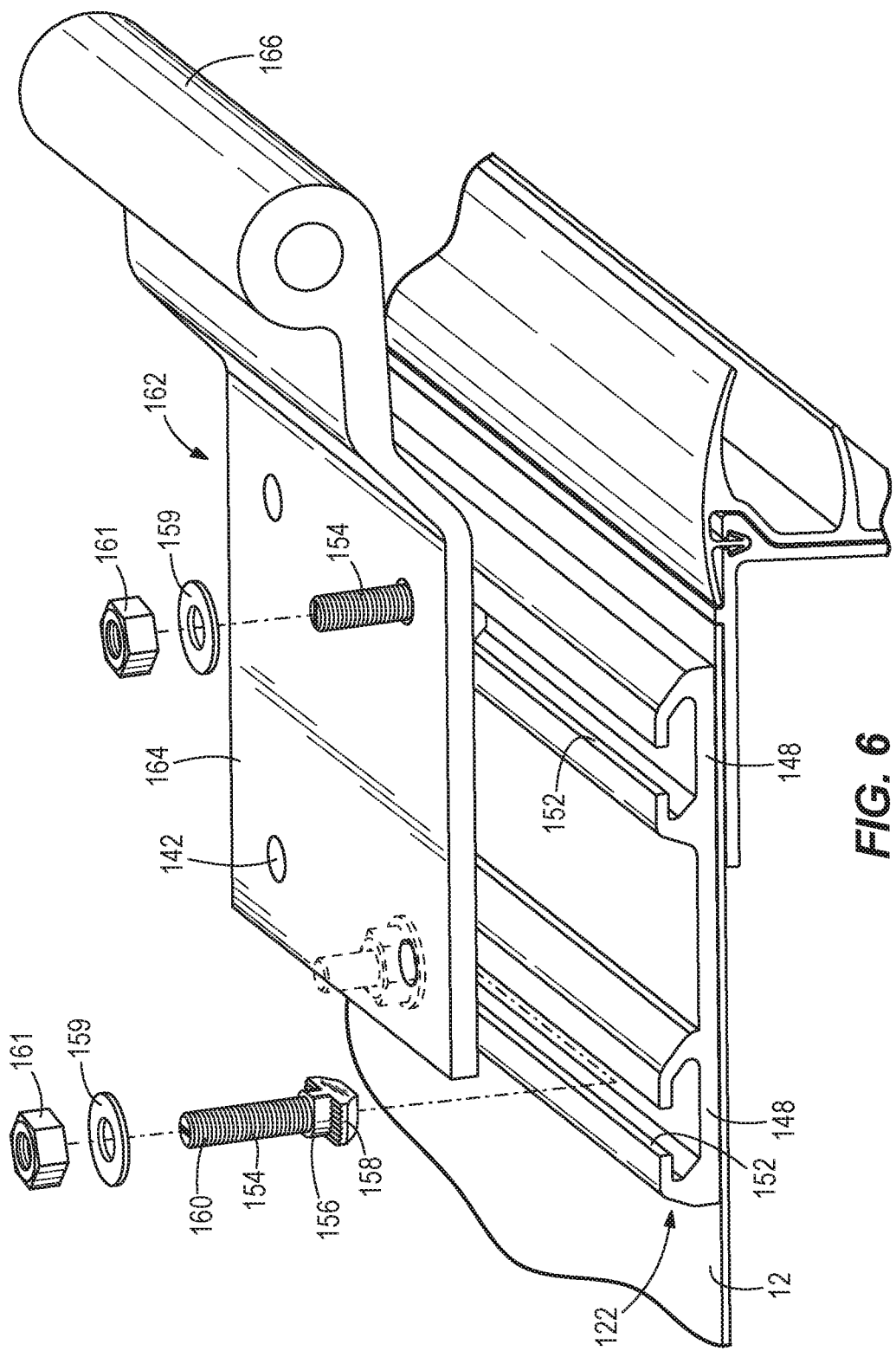
FIG. 6 is a partial perspective view of a door hinge and track according to an embodiment of the present invention.

Fasteners 154 such as T-bolts may be utilized in alternative locations throughout the trailer 10. For example, the description of FIGS. 3 and 4 (along with the alternatives thereto) presented above applies equally to the embodiment of FIG. 6. As shown in FIG. 6, a door hinge plate 162 (i.e., door side or frame side) is fixed to a track 122, and utilizes the same fasteners 54, channel 48, slot 42, as those described above in connection with FIGS. 3 and 4. The illustrated door hinge plate 162 includes a leaf 164 with one or more knuckles 166. The leaf 164 includes a number of apertures 142 for mounting the leaf 164 to one or more channels 148 of the track 122 with fasteners 154, such as any of the fasteners 54 described above in connection with the embodiment of FIGS. 2 and 3. The knuckles 166 interlace with knuckles on an adjacent hinge plate (i.e., the other of the door side hinge plate or the frame side hinge plate). A pin (not shown) is engaged with the interlaced knuckles 166 to fix the door panel 18 to the sidewall 12. Alternatively, the door panel 18 is fixed to a different surface (e.g., roof 13 or floor 14) of the trailer 10, dependent upon the direction of travel of the door panel 18.

With continued reference to the illustrated embodiment of FIG. 6, the track 122 is fixed to (or can instead be integral with) one of the sidewalls 12 (frame side hinge plate) or one of the door panels 18 (door side hinge plate). The track 122 includes two C-shaped channels 148 parallel to and spaced apart from one another, although a single channel 148 with a single fastener 154 and aperture 142, or single row of fasteners 154 and aperture 142, can instead be used. With the illustrated channels 148 parallel to one another, the track 122 may be produced with a constant cross-section through a process such as extrusion. Alternatively, the channels 148 may be perpendicular to one another and intersect with one another, and/or may be located at an alternative angle relative to one another. Each channel 148 includes an opening 152 extending along a length of the track 122 or the entire track 122. The height of the opening 152 can be similar to the diameter of the orifice 142 (i.e., both are sized to accept the shank 156 or threads 160 of the fastener 154).

In assembling the door hinge plate 162 to the track 122, the heads 158 of the fasteners 154 (one corresponding to each aperture 142) are placed within the openings 152 in the channels 148 and are rotated a quarter turn to prevent removal of the bolts 154. The fasteners 154 are moved along the channels 126 until they are positioned to accept the door hinge plate 162. Once positioned correctly, the door hinge plate 162 is placed adjacent the track 122 such that the fasteners 154 extend through the apertures 142. If the knuckles 166 of the door hinge plate 162 are aligned to interlace with the mating knuckles, fasteners 161 such as nuts (along with washers 159) are threaded onto the fasteners 154 to fix the door hinge plate 162 to the track 122. If the knuckles 166 are not properly aligned, the door hinge plate 162 slides along the track 122 until properly aligned. This allows for precise door alignment without necessitating the drilling or punching of permanent holes through the door 18 or sidewall 12. Further, utilizing two channels 148 and a plurality of fasteners 154 reduces the torsional force on each fastener 154 caused by offset weight of the door 18.

Although a leaf 164 and knuckle 166 hinge assembly is shown in FIG. 4 and described above, it will be appreciated that any other type of hinge assembly can instead be used while still employing the fasteners 154, channels 148, openings 152, and apertures 142 described above to secure the hinge assembly to a door and/or to an adjacent sidewall 12, roof 13, or floor 14. By way of example only, such alternative hinge assemblies include butt hinge, T-hinge, strap hinge, gate hinge, Soss hinge, piano hinge, and pivot hinge assemblies.

Figure 7:
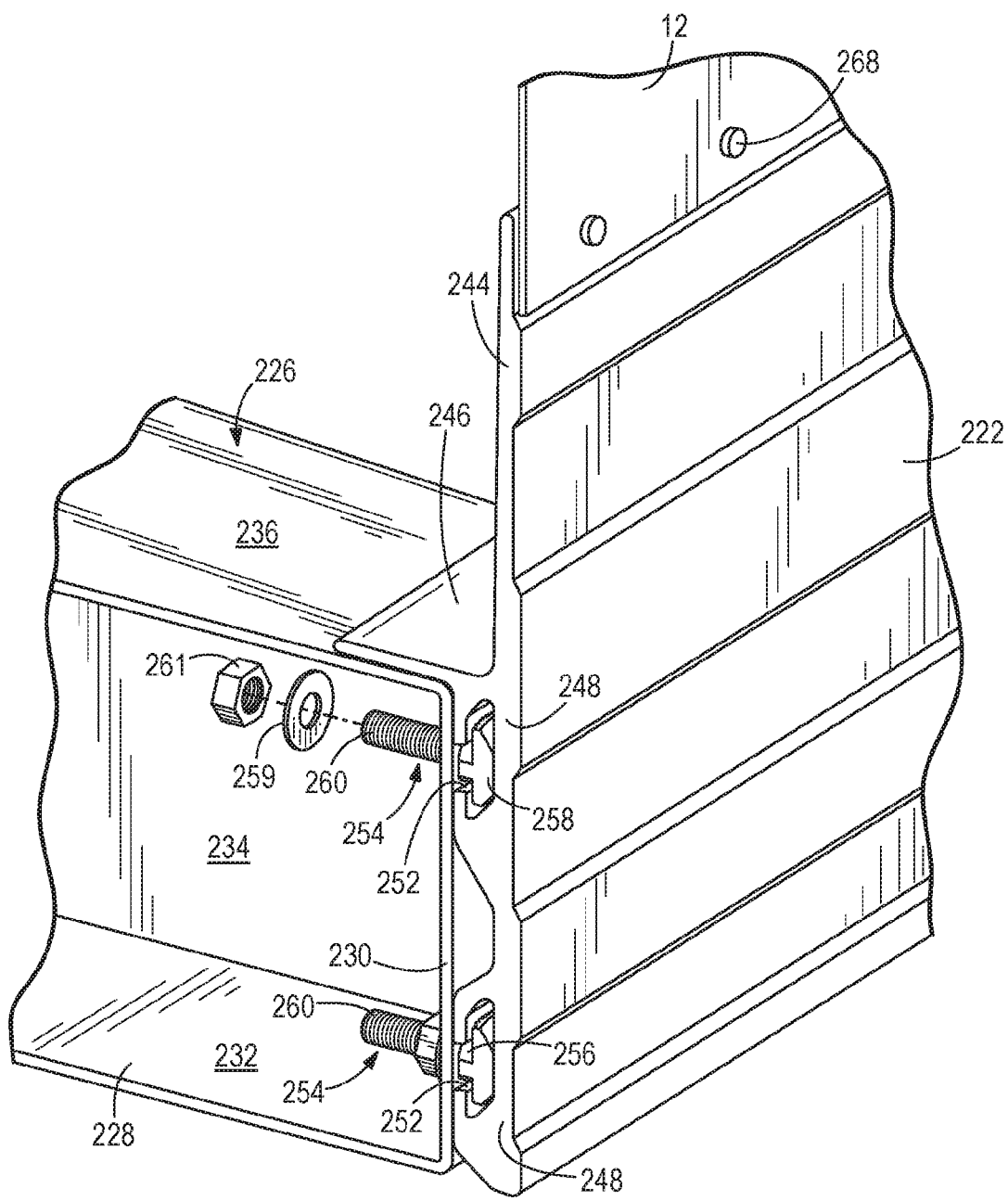
FIG. 7 is a partial perspective view of a cross-member and lower rail according to an embodiment of the present invention.

Another application of the structures of the present invention is illustrated in FIG. 7, which illustrates a lower rail 222 supporting a first end of a cross member 226. The description of FIGS. 3 and 4 (along with the alternatives thereto) presented above applies equally to the embodiment of FIG. 7. A second end of the cross member 226 (not shown) mirrors the first end, and is supported by a second lower rail 222 in a similar manner. The cross member 226 spans a width W of the trailer between parallel sidewalls 12, and includes an I-beam 228 with flat end caps 230. Any other cross member cross-sectional shape can be used as desired. The I-beam 228 of the illustrated embodiment includes a lower portion 232 which transitions to a central portion 234 perpendicular to the lower portion 232. An upper portion 236 extends outward from the central portion 234 to form a constant cross-section of the letter "I". In other embodiments, the I-beam 228 instead has an orientation in which it is rotated some amount (e.g., 90 degrees) about its longitudinal axis in comparison to the orientation shown in FIG. 7. When assembled, the lower portion 232 and the upper portion 236 of the illustrated embodiment are parallel to one another, as well as to the roof 13 of the trailer 10. The upper portion 236 may include apertures (not shown) for fixing the floor 14 to the cross member 226, which, when assembled, is adjacent the floor 14.

With continued reference to the illustrated embodiment of FIG. 7, the flat end caps 230 are fixed (e.g., welded, bolted, integral with, etc.) to the I-beam 228 at the ends of the beam 228, thereby abutting the lower rail 222 when installed. In some alternative embodiments, the beam 228 need not necessarily abut the rail 222 as discussed above in connection with the embodiment of FIGS. 3 and 4. Each end cap 230, as shown, is a flat panel which is parallel with the sidewalls 12 (and is therefore also parallel with a constant cross-section of the beam 228). The end cap 230 includes a plurality of slots (i.e., apertures 242) for accepting fasteners 254. The present embodiment includes four apertures 242, two apertures 242 to each side of the central portion 234. The lower rail 222 includes two channels 248, with openings 252 in each channel 248 aligning with two of the four apertures 242. Alternatively, the apertures 242 may be replaced by slots extending to an edge of the end caps 230, similar to the slot 42 shown in FIG. 3.

The lower rail 222 is fixed to the sidewall 12, extends downward (i.e., towards the floor 14) from the sidewall 12, and can span a gap between the sidewall 12 and the floor 14. The lower rail 222 can have a constant cross-section along the lengthwise direction L of the trailer 10. As shown in FIG. 7, the lower rail 222 includes a first portion 244, a second portion 246, and a plurality of channels 248. Though described as separate portions 244, 246, 248, the lower rail 222 may be formed as a single component (e.g., via extrusion, etc.). Also, the lower rail 222 can have different shapes and portions than shown in FIG. 7, such as a rail having a rectangular cross-sectional shape, an L-shaped cross-section, a C-shaped cross-section, and the like. The first portion 244 extends downward from the sidewall 12 and is fixed to the sidewall 12 via a plurality of fasteners 268 (i.e., bolts, rivets, etc.), or in any other suitable manner. The second portion 246 extends toward the interior of the trailer 10, and can be perpendicular to the first portion 244.

The second portion 246 of the lower rail 222 prohibits dirt, debris, and condensation from entering the channels 248 from above. Further, the second portion 246 can provide a surface for supporting the floor 14 of the trailer 10, and/or can prohibit a point or line force adjacent the sidewall 12 from shearing the fasteners 254.

The channels 248 extend parallel to the first portion 244 and can collectively have a similar height (parallel to the height H of the trailer 10) as the end cap 230 of the mating cross member 226. The channels 248 are C-shaped channels, each with an opening 252 extending along a length (or the entire length) of the rail 222. The height of the opening 252 is similar to the height of the aperture 242, and is less than the height of the channel 248 itself. The height of the opening 252 is sized to accept the shank 256 or threads 260 of the fastener 254 such as a bolt, which is shown in greater detail in FIG. 5.

With continued reference to the illustrated embodiment of FIG. 7, in assembling the cross member 226 to the lower rail 222, the heads 258 of the bolts 254 (one corresponding to each aperture 242) are laterally inserted within the openings 252 in the channels 226 and are rotated (e.g., a quarter turn) to prevent removal of the bolts 254 in an opposite direction. The bolts 254 are moved along the channels 248 until they are positioned to accept the cross member 226. Once positioned correctly, the cross member 226 is placed adjacent the lower rail 222 such that the bolts 254 extend through the apertures 242. If the cross member 226 is properly aligned (e.g., evenly spaced from adjacent cross members or otherwise positioned as desired) fasteners 261 such as nuts (along with washers 259) are threaded onto the bolts 254 to fix the cross member 226 to the lower rail 222. If the cross member 226 is not properly aligned, the cross member 226 slides along the tracks via the fasteners 254 until properly aligned. Contrary to current practices, this allows for precise alignment of the cross member 226 without necessitating the drilling or punching of permanent holes through the sidewall 12 or lower rail 222. This prevents the ill effects of external conditions (e.g., ice, rain, contact with road debris) upon fasteners that extend through to the exterior of the cargo body, which can lead to oxidation or rust.

What is claimed is:

1. A method of assembling a roof of a cargo body, the method comprising:
   providing a plurality of sidewalls, each comprising a side panel and an upper rail coupled to the side panel;
   locating a roof panel above the plurality of sidewalls adjacent the upper rails;
   extending a roof bow between the upper rails below the roof panel; and
   fixing the roof bow to a track of one of the upper rails with a fastener.

2. The method of claim 1, wherein the fastener includes a head that is received within and is movable along a slot of the track, wherein the fastener further includes an opposite end located outside of the slot.

3. The method of claim 2, wherein the opposite end is threaded for receiving a nut, wherein the nut is threaded on the fastener to provide a clamping force to secure the fastener with respect to the roof bow.

4. The method of claim 2, wherein the fastener for fixing the roof bow to the track of the upper rail is a T-bolt and further comprising a nut threaded on the T-bolt for providing a clamping force to the roof bow and the track.

5. The method of claim 1, wherein the fastener for fixing the roof bow to the track of the upper rail is a T-bolt.

6. The method of claim 1, wherein the track extends in a lengthwise direction parallel to the roof panel and terminates at a first end and a second end, and wherein the fastener engages with the track at the first end or the second end.

7. The method of claim 1, wherein the fastener is a T-bolt with a rectangular head, wherein:
   the rectangular head has a width of a first dimension and a length of a second dimension greater than the first dimension; and
   the slot of the track has a C-shaped cross-section with a width no less than the first dimension and less than the second dimension.

8. The method of claim 7, wherein fixing the roof bow to a track of one of the upper rails with the T-bolt further includes:
   aligning the width of the rectangular head of the T-bolt with the width of the slot of the track;
   translating the T-bolt relative to the track such that the rectangular head is within the track; and
   rotating the T-bolt relative to the track.

9. The method of claim 1, wherein the fastener does not extend through the upper rail.

10. The method of claim 1, further comprising fixing the roof bow to a track of another of the upper rails with another fastener.

11. A cargo body comprising:
   a floor comprising a floor panel and a cross member for supporting the floor panel;
   a plurality of sidewalls, each sidewall comprising a side panel and a lower rail coupled to the side panel, wherein each of the plurality of sidewalls extends from the floor at the respective lower rail and at least partially bounds a cargo receiving volume in cooperation with the floor panel;

a track extending along the lower rail of a first sidewall of the plurality of sidewalls; and a fastener coupling the cross member to the lower rail of the first sidewall, wherein the fastener is slidably adjustable to different positions along the track to position the cross member to different locations along the lower rail of the first sidewall.

12. The cargo body of claim 11, wherein the fastener is located entirely on one side of the first sidewall.

13. The cargo body of claim 11, wherein the track extends in a lengthwise direction parallel to the floor, and wherein the fastener is slidably adjustable along the track in the lengthwise direction.

14. The cargo body of claim 11, wherein the fastener extends in a first direction from a head of the fastener to a threaded region of the fastener, and wherein the head of the fastener is located within and is trapped within and adjustable along the track to the different positions.

15. The cargo body of claim 14, wherein the fastener is a first fastener, the cargo body further comprising an additional fastener operable to interact with the first fastener to provide a clamping force to the cross member and lower rail.

16. The cargo body of claim 15, wherein the first fastener is a T-bolt and the additional fastener is a nut.

17. The cargo body of claim 11, wherein the fastener is a T-bolt with a head, wherein the head has a width of a first dimension and a length of a second dimension greater than the first dimension, and wherein the track has a C-shaped cross-section with an opening extending along a lengthwise direction with a height greater than or equal to the first dimension and less than the second dimension.

18. The cargo body of claim 11, wherein the track is a first track and the lower rail of the first sidewall is additionally provided with a second track offset from the first track, the cargo body further comprising a second fastener coupling the cross member to the lower rail of the first sidewall, wherein the second fastener is slidably adjustable to different positions along the second track to position the cross member to different locations along the lower rail of the first sidewall.

19. The cargo body of claim 11, further comprising an additional fastener coupling the cross member to a track that extends along the lower rail of a second sidewall of the plurality of sidewalls.

20. A cargo body comprising:

a floor;

a roof;

a plurality of sidewalls extending from the floor to the roof to define a cargo receiving volume in cooperation with the floor and the roof;

a track fixed to one or more of the floor, the roof, and a sidewall of the plurality of sidewalls, the track having an elongated slot facing the cargo receiving volume of the cargo body; and a fastener received within the elongated slot and slidably engageable along the track within the elongated slot for adjustably securing a component of the cargo body to different locations along the track.

* * * * *